United States Patent
Haubner

[11] 3,898,972
[45] Aug. 12, 1975

[54] IGNITION SYSTEM FOR AN INTERNAL COMBUSTION ENGINE WITH AUTOMATIC TIMING SHIFT

[75] Inventor: Georg Haubner, Berg, Germany

[73] Assignee: Robert Bosch G.m.b.H., Stuttgart, Germany

[22] Filed: Nov. 15, 1973

[21] Appl. No.: 416,225

[30] Foreign Application Priority Data
Nov. 16, 1972 Germany............................ 2256174

[52] U.S. Cl. ......................... 123/148 E; 123/117 R
[51] Int. Cl. .............................................. F02p 3/06
[58] Field of Search ..................................... 123/148

[56] References Cited
UNITED STATES PATENTS
3,461,345   8/1969   Gilbert ............................ 123/148 E
3,630,185  12/1971   Struber et al. ................. 123/148 MC Primary Examiner—Manuel A. Antonakas
Assistant Examiner—Joseph Cangelosi
Attorney, Agent, or Firm—William R. Woodward

[57] ABSTRACT

A timing pulse generator supplies the control current circuit of an electronically controlled switching element in the main current circuit of the ignition system over a full wave rectifier of which one half-wave branch includes a Zener diode preventing rectification unless the voltage exceeds its threshold value. The timing pulse generator provides a pair of succeeding pulses of opposite polarity at the end of each spark timing interval, the second pulse being of smaller amplitude. The Zener diode blocks the first pulse from the output of the rectifier at low engine speeds, so that the second pulse controls the timing. At intermediate engine speeds the first pulse overcomes the Zener diode voltage and takes over control of the timing, producing a jump advance of the spark timing. At high engine speeds a parallel combination of a capacitor and a resistor prevents the second pulse produced by the timing generator from interfering with the prompt quenching of the electronically controlled switching element in the main current circuit of the ignition system, because during the short timing interval the capacitor does not discharge fully through the resistor. By means of a switch, the first timing pulse can be loaded down to transfer the timing to the second pulse at high speeds during conditions when more complete combustion can thus be provided without sacrifice of needed power.

8 Claims, 7 Drawing Figures

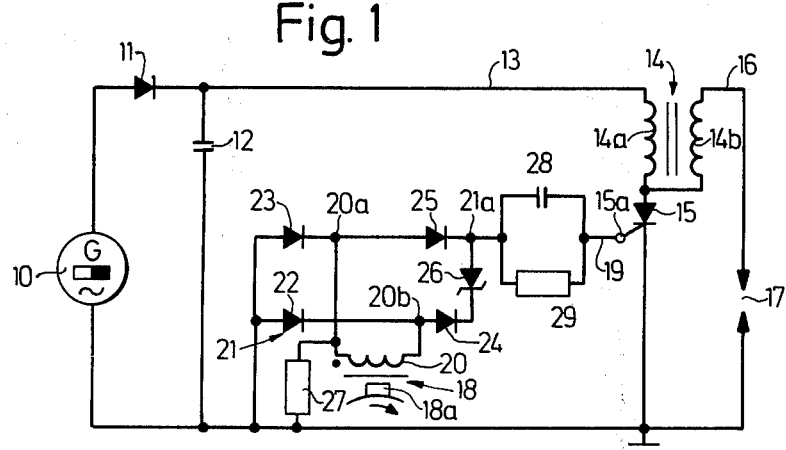
Fig. 1
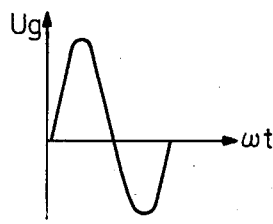
Fig. 2a
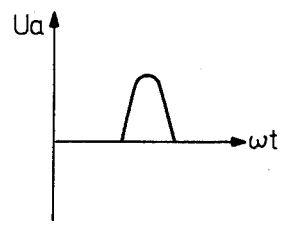
Fig. 2b
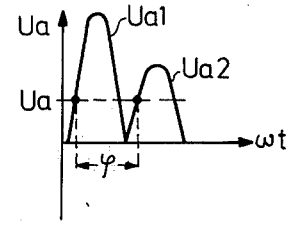
Fig. 2c
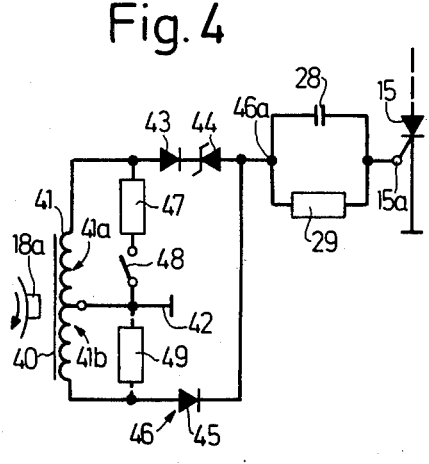
Fig. 4
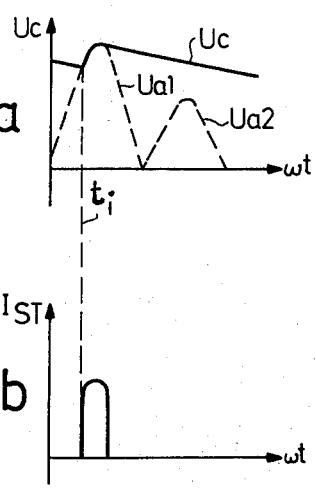
Fig. 3a
Fig. 3b

IGNITION SYSTEM FOR AN INTERNAL COMBUSTION ENGINE WITH AUTOMATIC TIMING SHIFT

This invention relates to an ignition system for internal combustion engines of the type in which a magnetic timing pulse generator driven by the engine switches an electronic switching element to time the engine ignition. More particularly the invention concerns ignition sytems in which the timing generator produces a positive-going pulse followed by a negative-going pulse, or vice versa, and the circuit interconnecting the timing pulse generator and the semiconductor switching element is arranged to use the second of these pulses to time the engine ignition at low speed and the first at high speed, thus providing spark advance at high speed.

In ignition systems of this type the timing pulse generator uses a revolving element, driven by the engine, magnetically coupled to a winding, so as to produce a sequence of two pulses of opposite polarity. The winding is connected to a full wave rectifier at the output of which both pulses are fed to the ignition control circuit in the same polarity, but they do not have the same amplitude.

A known circuit of this type provides a resistor in the rectifier circuit to load the first voltage pulse of the timing pulse generator, so that at the output of the rectifier the amplitude of the first voltage pulse will be smaller than that of the unloaded second voltage pulse. Since the voltage swing of both pulses increases with increasing engine speed, the known ignition system here referred to is so arranged that the amplitude of the smaller first pulse is not sufficient to turn on the electronic switching element in the main circuit of the ignition system when the engine is running in its lower speed range, so that the ignition timing is then determined by the second stronger voltage pulse. At higher engine speeds, however, when both pulses reach higher voltages, ignition is timed by the first of the two voltage pulses, which is now sufficiently strong. The timing is in this manner given a jump advance of about 15° of the crankshaft revolution as the engine speed passes a particular speed threshold.

The above arrangement has the disadvantage, in ignition systems using a capacitor discharge through the ignition coil at the moment of spark timing, that at high speeds a new charge of the capacitor begins as soon as the discharge has occurred to produce a spark, before the second of the above-described pair of voltage pulses has died away sufficiently at the control electrode of the semiconductor controlled rectifier (SCR) in the main current circuit of the ignition system to allow this SCR to return to its nonconducting state. The SCR then remains conducting during the beginning of the recharging of the capacitor and thus interferes with this recharging. This often leads to an undesired speed limiting of the engine. In the case of multicylinder engines, in which the time spacing between two successive sparks is half or less of what it would be with a single cylinder engine, this known ignition system cannot be used, because in this case the above-mentioned speed limiting effect would set in at a considerably lower speed.

It is an object of this invention to constitute the control circuit of such an ignition system in a manner that will prevent the ignition operation from limiting the speed of the engine and will provide ignition with a jump advance characteristic at a certain speed that will be fully operative over a normally desired speed range.

SUBJECT MATTER OF THE PRESENT INVENTION

Briefly, a voltage threshold diode, which may typically be a Zener diode, is provided in one of the half-wave paths of the full wave rectifier, the one in which a first and larger voltage wave is arranged to pass except for the effect of this Zener diode. The threshold voltage of the Zener diode is such as to be higher than the amplitude of the first voltage wave in the low speed range of the engine. Furthermore a capacitor bridged by a resistor is connected in series with the control path of the electronic switching element that switches the main current path of the ignition system, so that the capacitor voltage counteracts the voltage of the second, smaller voltage pulse of the timing generator and, at the higher speeds of the engine, outweighs it.

In this manner it is provided that in the lower speed range the first voltage pulse of the timing pulse generator will be blocked by the threshold diode, which is preferably a Zener diode, and the second voltage pulse will be used to time the spark. In the higher speed range, on the other hand, the first voltage pulse is used to time the spark, while the second voltage pulse is blocked by the charging of the series capacitor produced by the previous pulse and thus can no longer reach the control electrode of the electronic switching element, which will accordingly be promptly extinguished when the voltage across its switching path drops to zero.

The invention will be described with the illustration of two embodiments with reference to the accompanying drawings, in which:

FIG. 1 is a circuit diagram of an ignition system according to the invention;

FIG. 2 shows graphs of the voltage during one revolution of the engine as follows:

FIG. 2a: at the output of the timing generator winding,

FIG. 2b: at the output of the bridge rectifier during operation in the low speed range, and FIG. 2c: at the output of the bridge rectifier during operation in the higher speed range;

FIG. 3a is a graph showing the voltage on the capacitor in the control current during operation in the higher speed range;

FIG. 3b is a graph of the control current flowing at the time of the voltages shown in FIG. 3a, and FIG. 4 is a circuit diagram of an ignition system according to the invention utilizing a timing generator having a tapped winding.

FIG. 1 shows an ignition system for a one-cylinder internal combustion engine energized by a magneto generator 10 having one of its output terminals grounded to the chassis and the other connected over a diode 11 with a storage capacitor 12, the other terminal of which is likewise grounded. The primary winding 14a of a transformer in the form of a usual ignition coil 14, in series with the switching path of an electronic switching element 15, in the form of an SCR, provides a circuit in parallel to the storage capacitor 12. Capacitor 12, primary winding 14a and SCR 15 form what may be defined as the main current circuit 13 of the ignition system. The secondary winding 14b of the spark coil 14 has one end connected with a terminal of the primary winding 14a and the other connected over an ignition cable 16 with a spark plug 17.

A magnetic pulse generator 18 is the timing pulse generator that causes the control circuit of the SCR 15 to operate. It has a winding 20 in which current pulses are induced by the passage of a pole piece 18a or the like that concentrates magnetic lines of force is driven in a rotary path by the engine in the same way as the rotor (not shown) of the magneto generator 10. The pulses formed in the winding 20 ultimately supply a control current circuit 19 in a manner to be described.

The winding 20 of the timing generator 18 has its two terminals 20a and 20b connected to a full wave rectifier having four diodes 22–25 connected as a bridge rectifier 21. Interposed in one of the half-wave conducting paths of the bridge rectifier 21 is a voltage threshold diode 26, typically a Zener diode. One terminal 20a of the timing generator winding 20 is in circuit to ground over a resistor 27, and two diodes 22 and 23 of the bridge rectifier have their anodes likewise grounded to the chassis. A capacitor 28 and a resistor 29 connected in parallel to the capacitor are interposed between the output terminal 21a of the rectifier bridge 21 and the control electrode 15a of the SCR 15. The control current circuit 19 is completed by the ground connection of the cathode of the SCR 15.

OPERATION OF THE CIRCUIT OF FIG. 1

During operation of the internal combustion engine (not shown) an alternating current is produced by the magneto generator 10 and the positive voltage half waves of this alternating current pass through the diode 11 to charge up the storage capacitor 12. Since at this time the SCR 15 in the main current circuit 13 of the ignition system is blocked, the charge of the storage capacitor 12 cannot flow away. As soon as the magnetically conducting element 18a moves past in the timing generator 18, there are induced in the winding 20 of the timing generator two successive oppositely directed voltage pulses, the effects of which will be explained with reference to the three diagrams of FIG. 2.

FIG. 2a shows the course of the timing generator voltage $U_n$ with reference to the voltage at the terminal 20a of the winding as reference potential, during the successive pulses just mentioned. The first voltage half wave appearing at the terminal 20b of the timing generator winding 20 is positive and accordingly arrives to the cathode of the Zener diode 26, communicated through the rectifier diode 24 which is operating in its direction of conduction. The succeeding negative voltage half-wave arrives directly to the output 21a of the bridge rectifier 21 after passing through the conducting diode 25. During this second voltage half wave the timing generator winding 30 is bridged by the series combination of the resistor 27 and the diode 22 of the bridge rectifier 21, so that this voltage half wave is loaded down and is smaller than the preceding first voltage half-wave.

During operation of the internal combustion engine in its lower speed range, the amplitude of the first voltage pulse in the timing pulse generator winding 20 is less than the threshold voltage of the Zener diode, which is about 7.5V, so that this voltage pulse is blocked and does not reach the output 21a of the bridge rectifier 21. As shown in FIG. 2b only the second, smaller voltage pulse, rectified by the diode 25 reaches the output 21a of the bridge rectifier 21. Since in the lower speed range of the engine the time between successive ignition sparks is relatively great, no voltage can be built up on the capacitor 28, since the capacitor is discharged by the resistor 29 during the relatively long interval. The second voltage pulse of the timing generator winding 20 therefore arrives at the control electrode 15a of the SCR 15 over the capacitor 28 and switches the SCR into its conducting condition, this moment being the proper spark timing moment for these conditions of operation. The storage capacitor 12 then suddenly discharges through the primary winding 14a of the ignition coil 14 and the SCR 15. The high voltage thereby induced in the secondary winding 14b produces a spark in the spark plug 17. After the discharge of the storage condenser 12 the SCR 15 is turned off and stays blocked. The next positive voltage half-wave of the magneto generator 10 charges the storage condenser 12 anew over the diode 11. The charging and discharging of the storage condenser 12 is repeated with every full revolution of the magneto generator 10 and of the magnetically conducting element 18a.

With increasing engine speeds, the voltage pulses induced in the timing generator winding 20 become greater and at a certain speed the amplitude of the first voltage pulses of each pulse pair exceeds the threshold value of the Zener diode 26, so that the latter becomes conducting. With further increase in speed, the first voltage pulse also passes over the Zener diode 26 and the capacitor 28 to the control electrode 15a of the SCR 15. Under these conditions, as shown in FIG. 2c, both voltage pulses of the timing pulse generator 20 appear at the output 21a of the bridge rectifier 21 and as soon as the first voltage pulse reaches the firing voltage $U_n$ of the SCR 15, the latter is switched into its conducting condition. The spark timing is thus shifted towards earlier ignition (spark advance) by the angle $\Phi$ (with reference to the engine cycle), which improves the efficiency of the internal combustion engine in its higher speed range.

With still further increase of speed, the intervals between ignition sparks become shorter, so that the capacitor 28 can no longer fully discharge over the resistor 29. In consequence, there is built up across the capacitor 28 a capacitor voltage $U_c$ of a polarity opposing the voltage pulses of the timing generator 18. As shown in FIG. 3a, the capacitor 18 is charged by the first voltage pulse $U_{n1}$, so that the next, smaller voltage pulse $U_{n2}$, the amplitude of which is less than the capacitor voltage $U_c$, remains ineffective, being fully counteracted and outweighed by the capacitor voltage. As soon as the first, larger voltage pulse $U_{n1}$ exceeds the capacitor voltage $U_c$, a control current $I_c$ begins to flow in the control current circuit 19, as shown in FIG. 3b, and this control current recharges the capacitor 18 in addition to switching the SCR 15 into its conducting condition. In the upper speed range of the engine, therefore, the ignition moment $t_i$ is determined by the beginning of the charging of the capacitor 28.

SCR 15 is forced to return to its blocked condition after the discharge of the storage capacitor 12, even though at this speed of operation the timing pulse generator 18 is producing its second, smaller voltage pulse $U_{n2}$, because the latter pulse under these conditions cannot affect the control electrode 15a and therefore cannot hinder the recharging of the storage capacitor 12.

FIG. 4 shows another illustrative embodiment of the invention in a control circuit for the SCR 15 of the main current circuit shown in FIG. 1 for a capacitor discharge ignition system. In the circuit of FIG. 4 the revolving magnetically conducting element 18a driven by the engine excites a pulse generator 40 having a tapped winding 41 with its tap 42 near the intermediate point of the winding grounded to the chassis, so that the winding is subdivided into two parts 41a and 41b each connected to the input of one half-wave branch of a full wave rectifier circuit. One rectifier branch is provided by a diode 43, in series with which a Zener diode 44 is connected, whereas the other rectifier branch contains only the diode 45. The full wave rectifier 46 thus constituted across the terminals of the timing generator winding 41 has its output connection 46a connected over the parallel combination of the capacitor 28 and the resistor 29 to the control electrode 15a of the SCR 15, of which the cathode is grounded to the chassis. The winding portions 41a and 41b of the timing generator winding 41 are wound with a different number of turns, with the winding portion 41a, which is connected to the rectifier branch containing the Zener diode 44, having the larger number of turns. The rectifier branch containing the Zener diode 44 is also arranged to have its input grounded over a resistor 47 and a switch 48 operated by the engine according to a known form of timing shift operation.

OPERATION OF THE CIRCUIT OF FIG. 4

When the magnetically conducting element 18a of the timing pulse generator 40 passes by, it likewise excites two succeeding voltage pulses in the winding portions 41a and 41b of the timing generator winding. This winding is so connected to the full wave rectifier 46 that the first voltage pulse induced in the winding portion 41 that has the greater number of turns passes over the diode 43 to reach the Zener diode 44, while the voltage pulse simultaneously produced in the winding portion with the smaller number of turns is blocked by the diode 45. The succeeding second voltage pulse in the portion 41a of the pulse generator winding 41, on the other hand, is blocked by the diode 43, while the voltage pulse of correspondingly smaller amplitude in the winding portion 41b with the smaller number of turns reaches the output 46a of the full wave rectifier 46 over the diode 45.

In the lower speed range of the engine the Zener diode 44 blocks the first voltage pulse in the winding portion 41a with the larger number of turns, so that the smaller, second voltage pulse from the winding portion 41b reaches the control electrode 15a of the SCR 15 over the diode 45 and the capacitor 48 and switches the SCR into its conducting condition, this being the proper ignition timing under these conditions. In the medium speed range of the engine, the first voltage pulse in the winding 41a overcomes the threshold voltage of the Zener diode 44 and arrives to the control electrode 15a of the SCR 15 over the capacitor 28 before the second voltage pulse, so that the ignition timing of the engine is shifted in the advance direction. In the high speed range the capacitor 28 is charged by the first voltage pulse to such an extent that it can no longer discharge fully over the resistor 29 in the interval between sparks. In consequence, in this circuit too a capacitor voltage $U_r$ is effective, as shown in FIG. 3a, to be charged up by the first voltage pulse $U_{a1}$ with every full revolution of the magnetically conducting element 18a to a voltage above the peak amplitude of the succeeding smaller voltage pulse $U_{a2}$.

An advantageous refinement of the invention can be provided by means of the resistor 47 and the switch 48 connected in series therewith. The switch 48 may be operated automatically when the engine is idling unloaded in a known manner and it is not necessary in the ignition system of this invention to sacrifice power to retard the spark timing in order to obtain as complete a combustion in the engine as possible. This effect is provided by the switch 48 which bridges the resistor 47 across the winding portion 41a and thus loads the first voltage pulse so heavily that its amplitude falls below the amplitude of the second voltage pulse. Capacitor 28 is then no longer sufficiently charged, so that now the second voltage pulse $U_{a2}$ switches the SCR 15 into its conducting condition, thus retarding the spark timing by the angle $\Phi$.

Although the invention has been described with respect to particular embodiments, variations and modifications may be made within the inventive concept. For example, a timing generator with two equal winding portions can just as well be used in the control circuit of the ignition system, in which case the winding portion 41b of the timing generator winding 41 can be bridged by a resistor 49, as shown by the broken line connection in FIG. 4, the winding portions 41b being the portion of the timing generator winding which is connected to the branch of the rectifier which contains the diode 45 and does not contain any Zener diode. In this way also it can be assured that the second voltage pulse at the output 46a of the full wave rectifier 46 will have an amplitude smaller than that of the first voltage pulse produced in the winding portion 41a, because the former (the second voltage pulse) is sufficiently loaded down by the resistor 49.

Both the rectifier circuit in the control circuit of the semiconductor switching element and also the Zener diode can be differently arranged within the present inventive concept or replaced by other correspondingly operating switching elements. This holds also for the SCR in the main current circuit of the ignition circuit. It should finally also be mentioned that the invention is also applicable for so-called coil ignition circuits which are provided with an electronically controlled switching element in the main current circuit of the ignition system.

I claim:
1. An ignition system for an internal combustion engine, comprising:
   an ignition coil having a primary winding and a secondary winding;
   a semiconductor switching element having a control electrode leading to a control path therein and having a switched path in circuit with said primary winding of said ignition coil;
   at least one spark plug in circuit with said secondary winding of said ignition coil;
   a mechanically driven ignition timing pulse generator of the kind producing two electrical pulses of opposite polarity in quick succession for each spark cycle, arranged so that the first of said two pulses has the greater amplitude;
   a full wave rectifier in circuit with said timing pulse generator and said control path of said semiconductor switching element, so as to apply both of said pulses to said control path of said semiconductor switching element in the polarity required for switching said semiconductor switching element on;

a voltage threshold diode means interposed in the path of said full wave rectifier for unbalancing the output thereof in such a way that when said timing pulse generator is driven at low speed, the first of said two pulses is effectively suppressed and the second is applied to said semiconductor switching element for ignition timing, and capacitor means bridged by a resistor in series with said control path of said semiconductor switching element of such electrical magnitudes that at higher driven speeds of said timing pulse generator, the second of said two pulses is counteracted and thereby effectively suppressed by the voltage across said capacitor.

2. An ignition system as defined in claim 1 in which said capacitor (28) and said resistor (29) are interposed between the output (21a, 46a) of said full wave rectifier (21, 46) and said control electrode (15a) of a semiconductor control rectifier (15) constituting the aforesaid semiconductor switching element.

3. An ignition system as defined in claim 1 in which said timing pulse generator has a winding (20) and said winding is bridged by resistor means (27) in series with a diode (22) of said full wave rectifier which conducts during the second of said two pulses produced in said timing generator (18).

4. An ignition system as defined in claim 3 in which both ends (20a, 20b) of said winding (20) of said timing generator (18) are respectively connected to the input terminals of a bridge rectifier (21).

5. An ignition system as defined in claim 1 in which said timing generator (18) is provided with a winding (41) provided with a tap at an intermediate point of said winding, said tap being connected to ground or chassis, and in which the ends of said winding are each connected to a half-wave branch of said full wave rectifier.

6. An ignition system as defined in claim 5 in which the winding portions (41a, 41b) on either side of said tap (42) have different numbers of turns, the winding portion (41a) of the branch of said full wave rectifier in which said voltage threshold diode (44) is contained being the winding portion having the greater number of turns.

7. An ignition system as defined in claim 5 in which the winding portion (41b) on one side of said tap which is connected to the branch of said full wave rectifier that does not contain said voltage threshold diode is bridged by resistor means (49).

8. An ignition system as defined in claim 7 in which the winding portion (41a) on one side of said tap which is connected to the branch of said full wave rectifier that contains said voltage threshold diode means (44) is bridged by a series-connected combination of resistor means and switch (48) for reducing the amplitude of pulses produced by said winding portion under selected engine operation conditions.

* * * * *